Feb. 12, 1929.

E. N. TURNER 1,701,989

PORTABLE STOVE

Filed Sept. 24, 1925

Inventor.
Elie. N.Turner.

By
Attorney.

Patented Feb. 12, 1929.

1,701,989

UNITED STATES PATENT OFFICE.

ELIE NAPOLEON TURNER, OF MONTREAL, QUEBEC, CANADA, ASSIGNOR TO HENRI HORMISDAS DUCHESNE, OF MONTREAL, CANADA.

PORTABLE STOVE.

Application filed September 24, 1925. Serial No. 58,322.

The present invention relates to improvements in a portable stove which will hereinafter be fully described and is illustrated in the accompanying drawings in which—

Like numerals of reference indicate corresponding parts in each figure.

Figure 1:
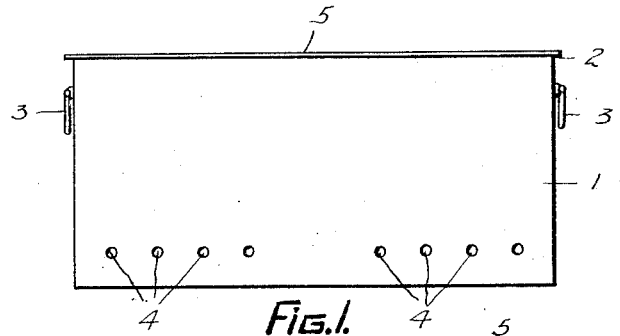
Figure 1 is a side elevation view of a stove according to the invention.

Referring to the drawings, 1 is a preferably rectangular casing having an open upper side 2 and handles 3 on each end. In one of the side walls of said casing at a suitable distance from the bottom are provided one or more openings 4 for the circulation of air and 5 is a cover adapted to close said open side 2. In said cover 5 is provided a partition 6 whereby a compartment 7 is provided, in which may be placed napkins and the like.

Figure 2:
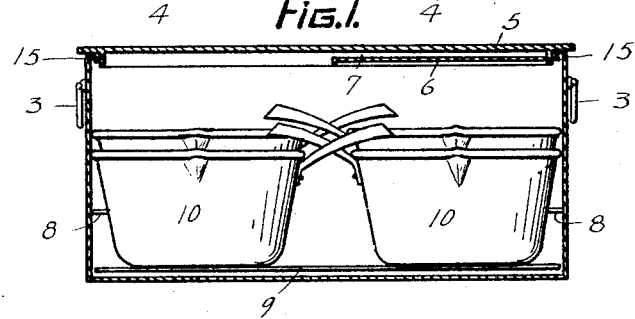
Figure 2 is a vertical longitudinal section view through Figure 1, showing the inner compact arrangement of the casseroles etc., when not in use.

Within said casing 1 at a suitable distance from the bottom preferably in each corner are located brackets 8, and 9 is a removable plate adapted to be supported by said brackets 8. The said plate 9 when not in use is located in the bottom of the casing (see Figure 2), thus providing a convenient space for the casseroles 10, heaters 11 and other kitchen utensils to be stored when the stove is not in use. The plate 9 has provided therein one or more holes 12, in which are mounted the heaters 11 or any similar condensed heating devices, and intermediate of said plate are provided one or more air circulation openings 13.

Figure 3:
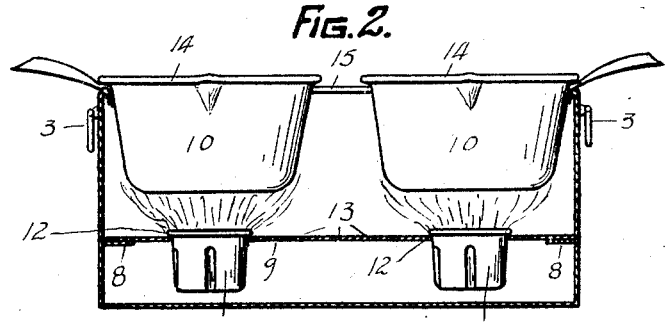
Figure 3 is a vertical sectional view illustrating the stove ready for use, the casseroles being suitably placed on the upper edges of the stove casing.
Figure 4:
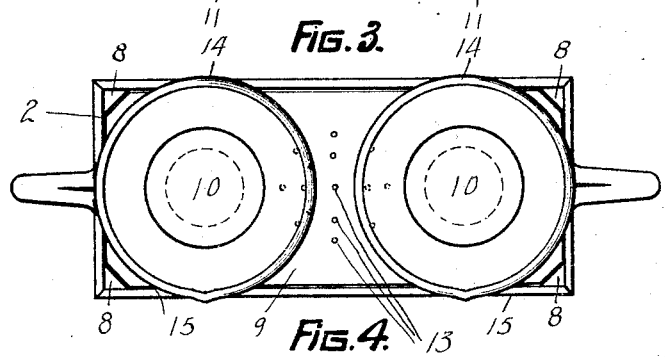
Figure 4 is a top view of Figure 3.

In the operation of the above described stove, the casseroles 10, heaters 11 and other kitchen utensils are removed from the casing 1 and the plate 9 is rested on the brackets or supports 8 (see Figure 3). The heaters 11 are placed in the holes 12 and the casseroles 10 are supported above the heating elements 11 by their edges 14 which are slightly larger in diameter than the inturned edges 15 of the casing 1.

It may be noted that an important feature of the present invention resides in the fact, that the heaters 11 are entirely protected from drafts etc., being completely enclosed in the casing 1, thus permitting the use of the stove outdoors. Another feature is that the stove and equipment are compact, inasmuch that when it is not in use plates, forks, knives, casseroles, heaters, napkins, are all contained in the casing 1, thus enabling same to be carried on excursions, picnics, and the like.

The above description relates to the particular form of the invention illustrated in the drawings, but it must be understood that improvements and modifications to its shape and the disposition of its elements may be made without departing from the scope of the accompanying claims.

What I claim as my invention is:

1. An article of manufacture of the character described, consisting of a casing having an open top and air circulation holes therein, a supporting member in each inner corner of said casing at a suitable distance from the bottom of said casing, a removable plate mounted on said supporting members, said plate having a plurality of openings in which are adapted heating elements, substantially as described.

2. An article of manufacture of the character described consisting of a casing having an open top and inturned edges in combination with a pan having outturned edges, said casing having air circulation holes therein, a supporting member in each corner of said casing located at a suitable distance from the bottom of said casing, and a removable plate mounted on said supporting members, said plate having an opening therein adapted to receive heating elements, substantially as described.

Signed at Montreal, Canada, this 7th day of May, 1925.

ELIE NAPOLEON TURNER.